(No Model.) 2 Sheets—Sheet 2.
D. M. SHAUL.
CULTIVATOR.
No. 430,323. Patented June 17, 1890.
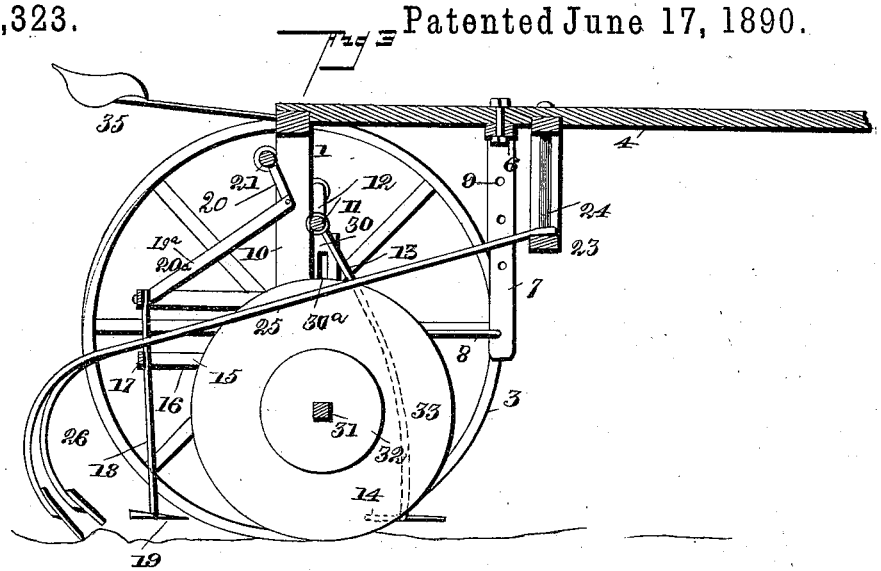
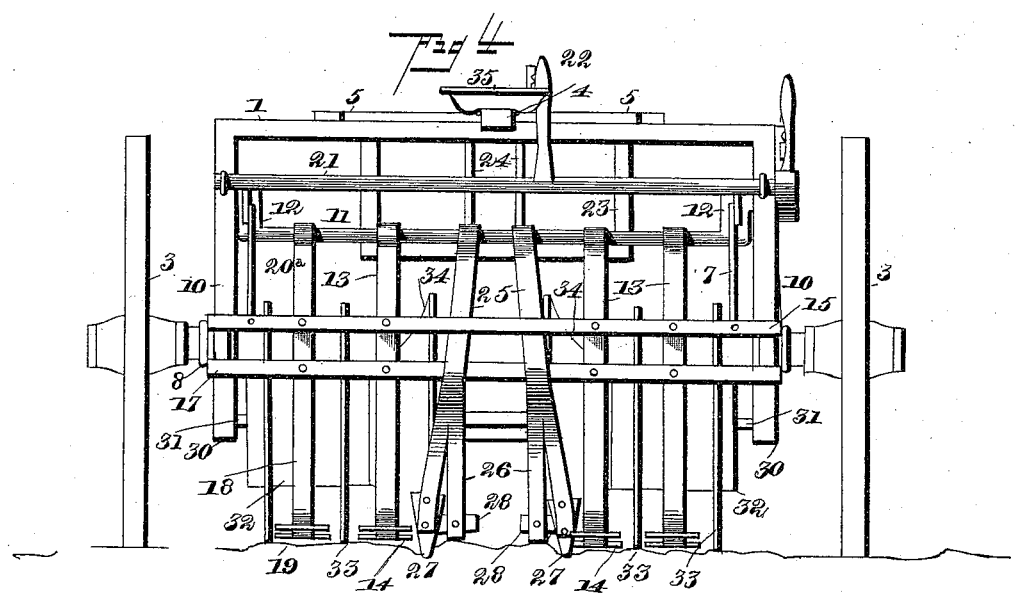
Witnesses
John Smirie
Wm. Bagger
Inventor
David M. Shaul
By his Attorneys
C. A. Snow & Co.

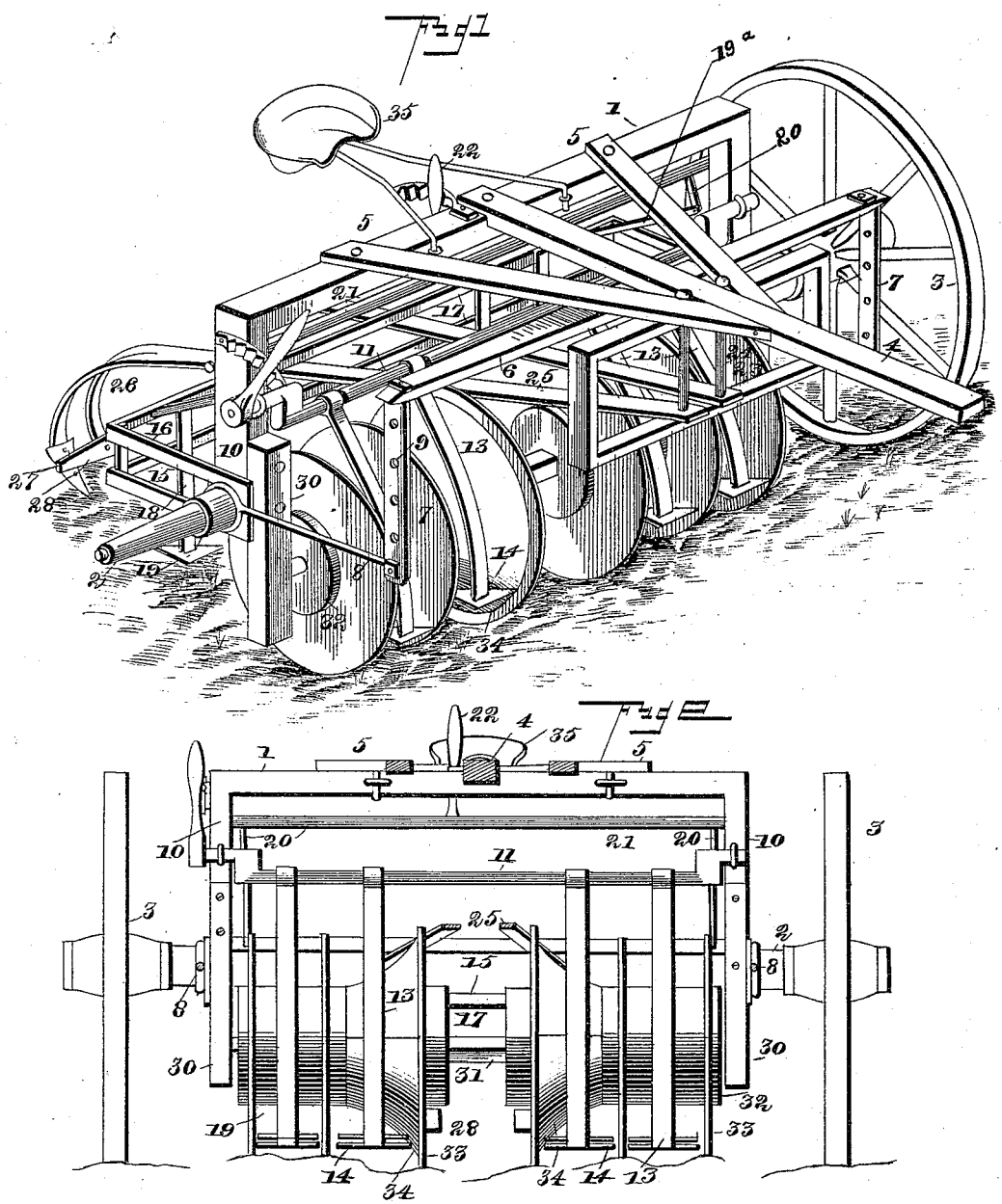

UNITED STATES PATENT OFFICE.

DAVID M. SHAUL, OF VERMILLION, SOUTH DAKOTA.

CULTIVATOR.

SPECIFICATION forming part of Letters Patent No. 430,323, dated June 17, 1890.

Application filed January 10, 1890. Serial No. 336,497. (No model.)

*To all whom it may concern:*

Be it known that I, DAVID M. SHAUL, a citizen of the United States, residing at Vermillion, in the county of Clay and State of South Dakota, have invented a new and useful Cultivator, of which the following is a specification.

This invention relates to cultivators; and it has for its object to construct a machine of this class, which shall serve at a single operation to crush or pulverize the soil, to cut and destroy the weeds, and to stir and agitate the soil and throw it in the direction of the rows of growing plants.

With these ends in view the invention consists in the improved construction, arrangement, and combination of parts, which will be hereinafter suitably described, and particularly pointed out in the claims.

In the drawings hereto annexed, Figure 1 is a perspective view of a cultivator embodying my improvements. Fig. 2 is a vertical transverse sectional view of the same. Fig. 3 is a longitudinal sectional view. Fig. 4 is a rear elevation.

Like numerals of reference indicate like parts in all the figures.

The frame of my improved machine consists of an arched axle 1, upon the spindles 2 of which the supporting-wheels 3 are mounted. The tongue 4 extends forwardly from the axle and is connected with the latter by means of braces 5.

6 is the doubletree, which is connected pivotally with the tongue and is provided at its ends with pendent links 7, the lower ends of which are connected with the spindles by means of rods 8. The links 7 are each provided with a series of perforations 9 for the attachment of the singletrees in the usual manner.

Upon the front sides of the arms 10 of the axle is journaled a rock-shaft 11, the ends of which are provided with cranks 12, which are journaled in the bearings upon the arms 10. Suitably attached to the rock-shaft 11 is a series of standards 13, the lower ends of which are provided with horizontal blades 14, forming the weed-cutters. One end of the rock-shaft 11 is provided with a handle, by means of which it may be operated to throw the weed-cutters into or out of operation.

15 designates the frame, which consists of arms 16 16, mounted pivotally upon and extending rearwardly from the spindles and connected at their rear ends by the cross-bar 17, to which standards 18, carrying horizontal blades or weed-cutters 19, are attached. The cross-bar 17 of the frame 15 is connected by pivoted rods 19ª with arms 20, extending from a rock-shaft 21, which is journaled in suitable bearings upon the rear sides of the arms 10 of the axle. Said rock-shaft has an operating-lever 22, by means of which it may be manipulated to throw the frame 15, with its attachments, into or out of operative position. To the under side of the tongue is attached a rectangular frame 23, provided with a pair of detachable vertical rods 24, upon each of which is mounted the front end of a beam 25, extending rearwardly and provided with curved standards 26, of ordinary construction, and carrying the cultivator-blades 27 and the fenders 28, all of which may be of any suitable approved construction.

To the front sides of the arms 10 of the axle are secured a pair of blocks 30, the inner sides of which are provided with grooves 30ª, (seen in Fig. 3 of the drawings,) in which are journaled the ends of a shaft 31, which is capable of sliding vertically in the said grooves. The shaft 31 carries two rollers 32, each of which is provided with a series of circular disks or cutters 33. Upon the rollers 32, adjacent to the inner cutters 33, are mounted beveled flanges 34, (clearly shown in Fig. 2,) each of which is preferably made in two or more sections in order to be readily detachable when desired.

A seat 35 for the driver is suitably attached to the axle of the machine. Suitable means are also provided whereby the operating-levers of the rock-shafts 11 and 21 may be retained in any position to which they may be adjusted.

The operation of my invention will be readily understood from the foregoing description, taken in connection with the drawings hereto annexed. The rollers 32 travel on each side of the row of growing plants, serving to crush and pulverize the soil, the circular cutters serving at the same time to prepare the soil for the easy passage of the weed-cutters, which cut under the soil and sever the roots of the weeds, which are thereby effectually destroyed. The flanges 34 upon the rollers form gutters or drains adjacent to the row of plants. Said flanges, however, may be dispensed with when the machine is used for cultivating planted or check-rowed corn. The cultivators and fenders at the rear end of the machine serve to agitate the soil and to throw it loosely over the roots of the growing plants. The general construction of my improved machine is simple and inexpensive, and it may be operated easily and with beneficial results.

Having thus described my invention, what I claim is—

1. In a cultivator, the combination of the frame, the vertically-movable shaft having the rollers provided with circular cutters, a rock-shaft journaled to the frame, the standards attached to the said rock-shaft and having rearwardly-curved lower ends, and the horizontal blades or weed-cutters upon the lower ends of said standards, substantially as and for the purpose set forth.

2. In a cultivator, the combination of the frame, the vertically-movable shaft, the rollers mounted upon the latter and having circular cutters, the rock-shaft having the weed-cutters attached thereto, and a frame having arms journaled upon the spindle and provided with standards carrying weed-cutters at their lower ends, substantially as and for the purpose set forth.

3. In a cultivator, the combination of the arched axle, the arms journaled upon and extending rearwardly upon the spindles of said axle, the cross-bars connecting the rear ends of said arms, the standards attached to said cross-bars and having weed-cutters at their lower ends, a rock-shaft journaled upon the rear side of the frame and having outwardly-extending arms, and pivoted rods connecting said arms with the cross-bars, to which the standard of the weed-cutters are attached, substantially as and for the purpose set forth.

4. In a cultivator, the combination, with the arched axle, the rollers, and cutters, of the tongue, a rectangular frame secured to the under side of the tongue, vertical rods mounted detachably in said frame, the rearwardly-extending beams having their front ends mounted upon said vertical rods, and the standards at the rear ends of said beams carrying the cultivator blades and fingers, substantially as set forth.

5. As an improvement in cultivators, the combination of the arched axle, the rock-shaft upon the front side of the same, having a series of standards provided with weed-cutters at their lower ends, a frame mounted pivotally upon the spindles of the axle and having a series of standards carrying weed-cutters at their lower end, a rock-shaft mounted upon the rear side of the axle and having outwardly-extending arms connected with the pivoted frame by means of suitable connecting-rods, a vertically-movable shaft, the rollers mounted upon said shaft and having the circular cutters, the beveled flanges mounted upon the inner ends of the rollers, a rectangular frame secured upon the under side of the tongue, extending forwardly from the frame, vertical rods mounted detachably in said frame, and the rearwardly-extending beams mounted upon said rods and provided at their rear ends with curved standards having the cultivator blades and fingers, all arranged and operating substantially as set forth.

In testimony that I claim the foregoing as my own I have hereto affixed my signature in presence of two witnesses.

DAVID M. SHAUL.

Witnesses:
 EDWARD FEAUTO,
 F. M. GILMORE.